US011166079B2

(12) United States Patent
Murali et al.

(10) Patent No.: US 11,166,079 B2
(45) Date of Patent: Nov. 2, 2021

(54) VIEWPORT SELECTION FOR HYPERVIDEO PRESENTATION

(71) Applicant: International Business Machines Corporation, Armonk, NY (US)

(72) Inventors: Srikanth K. Murali, Bangalore (IN); Bidhu Ranjan Sahoo, Bangalore (IN); Aparna Seshadri, Bengaluru (IN); Padmanabha Venkatagiri Seshadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 15/853,489

(22) Filed: Dec. 22, 2017

(65) Prior Publication Data

US 2019/0200082 A1  Jun. 27, 2019

(51) Int. Cl.
*H04N 21/4725* (2011.01)
*H04N 21/4728* (2011.01)
*H04N 21/8543* (2011.01)
*G06F 16/95* (2019.01)
*G06F 16/74* (2019.01)

(52) U.S. Cl.
CPC ....... *H04N 21/4725* (2013.01); *G06F 16/748* (2019.01); *G06F 16/95* (2019.01); *H04N 21/4728* (2013.01); *H04N 21/8543* (2013.01)

(58) Field of Classification Search
CPC ........... H04N 21/4725; H04N 21/4728; H04N 21/8543; G06F 17/30861; G06F 16/95; G06F 16/748
USPC ........................................................ 715/716
See application file for complete search history.

(56) References Cited

U.S. PATENT DOCUMENTS

| 6,965,890 B1 | 11/2005 | Kumar |
| 7,356,830 B1 | 4/2008 | Dimitrova |
| 7,765,462 B2 | 7/2010 | Kumar |
| 7,802,177 B2 | 9/2010 | Kumar |

(Continued)

FOREIGN PATENT DOCUMENTS

DE       102017009149 A1 *  5/2018  ............. H04N 5/232

OTHER PUBLICATIONS

Agarwal et al., "Building Rome in a Day", Communications of the ACM, Oct. 2011, 8 pages, vol. 54 No. 10, <https://dl.acm.org/doi/10.1145/2001269.2001293>.

(Continued)

*Primary Examiner* — Steven P Sax
*Assistant Examiner* — Koorosh Nehchiri
(74) *Attorney, Agent, or Firm* — Aaron N. Pontikos

(57) ABSTRACT

Embodiments of the invention provide a method, system and computer program product for viewport selection for hypervideo presentation. In a method for viewport selection for hypervideo presentation, a multiplicity of different hypervideos, for example 360° hypervideos, are played back to an end user and end user interactions by the end user with each of the different hypervideos are recorded. Then, an end user profile for the end user is computed from the recorded end user interactions so as to specify a particular viewport. Finally, in response to a directive by the end user to view a new hypervideo, the end user profile is retrieved and the particular viewport identified so that the new hypervideo is played back to the end user utilizing the particular viewport.

9 Claims, 2 Drawing Sheets

(56) References Cited

U.S. PATENT DOCUMENTS

| | | | |
|---|---|---|---|
| 8,464,181 B1* | 6/2013 | Bailiang | G06F 3/04815 715/848 |
| 8,531,449 B2 | 9/2013 | James | |
| 9,244,923 B2 | 1/2016 | Cooper et al. | |
| 9,280,258 B1* | 3/2016 | Bailly | G06T 3/40 |
| 9,361,943 B2 | 6/2016 | Sebastian | |
| 9,369,679 B2 | 6/2016 | Joakim | |
| 2002/0059094 A1* | 5/2002 | Hosea | H04N 21/25891 725/10 |
| 2007/0070069 A1* | 3/2007 | Samarasekera | G06F 3/011 345/427 |
| 2009/0062001 A1* | 3/2009 | LeMay | G07F 17/32 463/32 |
| 2010/0299691 A1* | 11/2010 | Emanuel | H04N 7/17327 725/14 |
| 2011/0099263 A1* | 4/2011 | Patil | G06Q 50/01 709/224 |
| 2011/0113334 A1* | 5/2011 | Joy | G06F 17/30056 715/716 |
| 2011/0200303 A1 | 8/2011 | Jose Carlos | |
| 2013/0151934 A1* | 6/2013 | McConville | G06F 17/30846 715/201 |
| 2013/0179925 A1* | 7/2013 | Woods | H04N 21/42209 725/42 |
| 2014/0047335 A1* | 2/2014 | Lewis | G06F 3/0484 715/716 |
| 2014/0282768 A1* | 9/2014 | Michael | H04N 21/23106 725/93 |
| 2015/0007070 A1* | 1/2015 | Saaroni | G06F 9/4443 715/763 |
| 2016/0005436 A1* | 1/2016 | Axen | G11B 27/031 386/240 |
| 2016/0132991 A1* | 5/2016 | Fukushi | A63F 13/5255 345/667 |
| 2016/0179293 A1* | 6/2016 | Girgensohn | H04N 5/765 715/719 |
| 2020/0336801 A1* | 10/2020 | Harviainen | G02B 27/017 |

OTHER PUBLICATIONS

Kuster et al., "FreeCam: A Hybrid Camera System for Interactive Free-Viewpoint Video", Vision, Modeling, and Visualization, 2011, 8 pages, <http://www.cs.technion.ac.il/~gotsman/AmendedPubl/Claudia/Kinect.pdf>.

Wang et al., "Multiview Video Sequence Analysis, Compression, and Virtual Viewpoint Synthesis", IEEE Transactions on Circuits and Systems for Video Technology, Apr. 2000, 14 pages, vol. 10 No. 3, <https://ieeexplore.ieee.org/stamp/stamp.jsp?tp=&arnumber=836284>.

* cited by examiner

VIEWPORT SELECTION FOR HYPERVIDEO PRESENTATION

BACKGROUND OF THE INVENTION

Field of the Invention

The present invention relates to video media presentation and more particularly to the presentation of hypervideo content in a computer.

Description of the Related Art

Hypervideo, also known as hyperlinked video, refers to the creation, transmission and presentation of an interactive video stream containing embedded, interactive anchors hyperlinking to different frames within the video stream or to external content sources so as to facilitate the navigation by an end user between portions of the video stream and other hypermedia elements both present within the video stream and also external to the video stream. In traditional hypervideo, a filming platform from which the video stream is acquired remains fixed in position presenting a singular view in each frame of the video stream. But, in three-hundred and sixty degree (360°) hypervideo, the filming platform provides at least for 360° potentially different views of a single plane about a vertex of a circle, and possibly 360° potentially different views of 360° of different planes about a vertex of a sphere. The latter provides, in essence, a virtual reality type experience in navigating the hypervideo.

In a simplistic implementation of hypervideo, drawing attention to a particular object of interest or hyperlinked element across a series of frames of the video stream differs only marginally from that of a static Web page. As a designer of the hypervideo, it is presumed that all hyperlinked elements of interest are within the view of the end user given the limited number of perspective viewports—that is positions of the camera providing distinct views. But, in the case of 360° hypervideo, hyperlinked elements of interest may be obscured based upon a particular selected viewport and a degree of zooming in and out associated with the viewport. Thus, given the massive navigational space presented by the 360° hypervideo, the proper selection of a viewport by the end user in interacting with the 360° hypervideo can have a substantial impact on the ability of the end user to fully realize the interactive nature of 360° hypervideo.

BRIEF SUMMARY OF THE INVENTION

Embodiments of the present invention address deficiencies of the art in respect to the presentation of 360° hypervideo and provide a novel and non-obvious method, system and computer program product for viewport selection for hypervideo presentation. In a method for viewport selection for hypervideo presentation, a multiplicity of different hypervideos, for example 360° hypervideos, are played back to an end user and end user interactions by the end user with each of the different hypervideos are recorded. Then, an end user profile for the end user is computed from the recorded end user interactions so as to specify a particular viewport. Finally, in response to a directive by the end user to view a new hypervideo, the end user profile is retrieved and the particular viewport identified so that the new hypervideo is played back to the end user utilizing the particular viewport.

In one aspect of the embodiment, the end user interactions include a selected viewport during playback of each of the different hypervideos. In another aspect of the embodiment, the end user interactions include a selection of different hypermedia elements in each of the different hypervideos. In yet another aspect of the embodiment, the end user interactions include one or more of a panning, tilting and zooming operation to bring into view a particular object in each of the different hypervideos. In even yet another aspect of the embodiment, the method additionally includes responding to a directive by a different but similar end user to view a different hypervideo by retrieving the end user profile, identifying the particular viewport and playing back to the different but similar end user the different hypervideo utilizing the particular viewport. To that end, different viewports of different end user profiles for different hypervideos may be assigned a similarity score based upon a similarity of imagery of each of the different hypervideos to the new hypervideo, and a particular one of the different viewports may then be identified based upon a highest degree of similarity indicated by a corresponding one of the similarity scores.

In another embodiment of the invention, a hypervideo presentation data processing is adapted for viewport selection. The system includes a host computing system that includes at least one computer with memory and at least one processor. The system also includes a video player executing in the memory of the host computing system. Finally, the system includes a viewport selection module. The module includes program code enabled upon execution in the host computing system to record end user interactions by an end user with each of different 360° hypervideos playing back in the video player, to compute from the recorded end user interactions, an end user profile for the end user specifying a particular viewport and to respond to a directive by the end user to view a new 360° hypervideo in the video player by retrieving the end user profile, identifying the particular viewport and playing back to the end user the new 360° hypervideo utilizing the particular viewport.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for viewport selection for hypervideo presentation. In accordance with an embodiment of the invention, an end user directs the playback of a multiplicity of different hypervideos in a portion of a content browser. Interactions with each of the different hypervideos by the end user are both monitored and recorded in order to compute a viewing profile for the end user specifying a particular viewport recognized as being associated with the playback of the different hypervideos. Thereafter, upon the end user directing playback of a new hypervideo, the viewing profile for the end user is retrieved so as to determine the particular viewport. Finally, the new hypervideo is played back utilizing the particular viewport. In this way, the hypervideo may be presented to the end user utilizing a viewport most likely to avoid hyperlinked content of interest from becoming obscured owing to the vast navigational space of the hypervideo.

Figure 1:
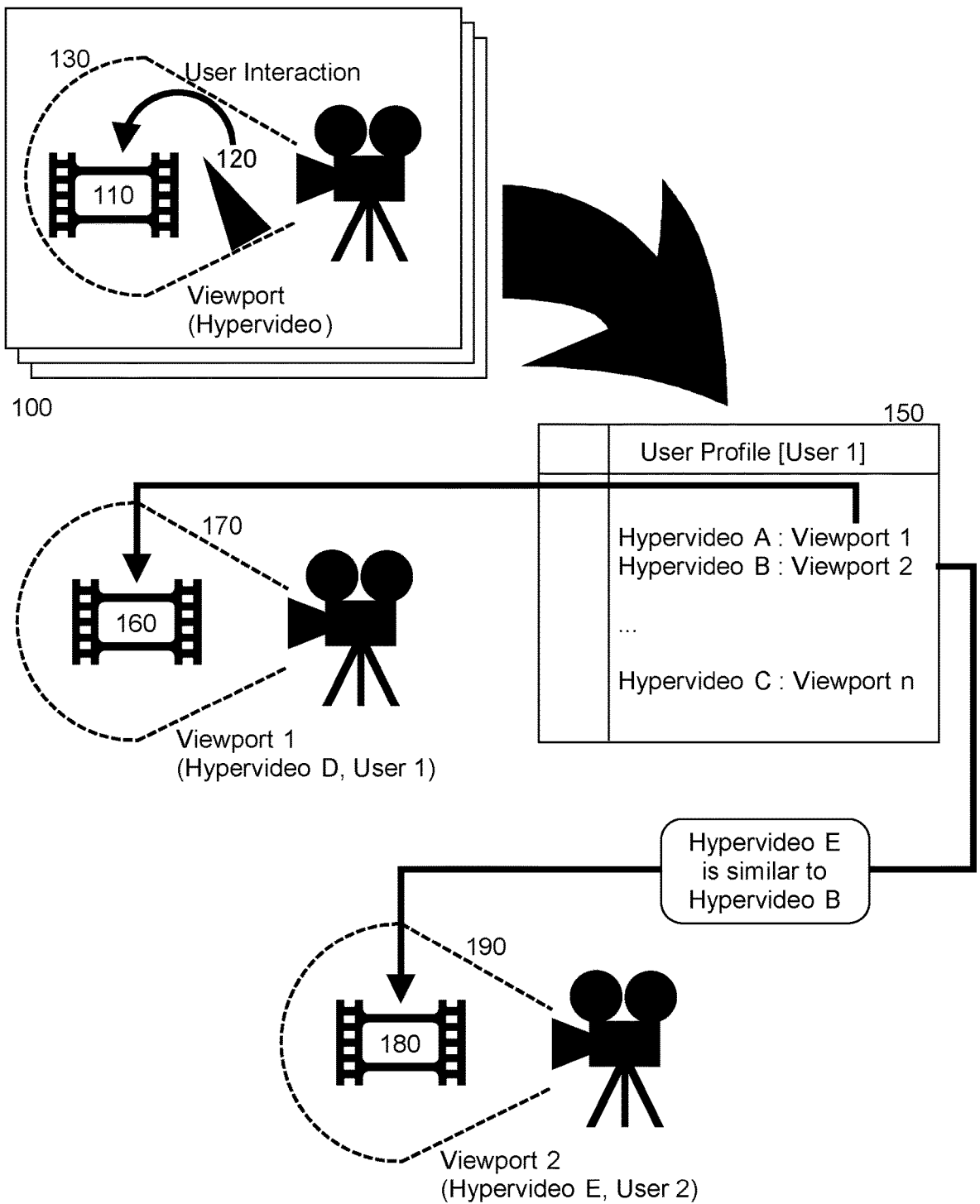
FIG. 1 is pictorial illustration of a process for viewport selection for hypervideo presentation.

In further illustration, FIG. 1 pictorially shows a process for viewport selection for hypervideo presentation. As shown in FIG. 1, a multiplicity of different hypervideos 110 are presented in video player 100. End user interactions 120 by a primary end user are recorded into a user profile 150 including a selected viewport 130 for each of the hypervideos 110 at which each of the hypervideos 110 is viewed. Thereafter, as the primary end user directs the playback of a new hypervideo 160, the user profile 150 of the primary end user is consulted to identify a particular viewport 170 associated with the new hypervideo 160 and the playback of the hypervideo 160 commences utilizing the particular viewport 170.

In this regard, the particular viewport 170 may be identified based upon a similarity of the new hypervideo 160 to a corresponding one of the different hypervideos 110. Optionally, a different end user also may direct the playback of a new hypervideo 180. However, the user profile 150 of the primary end user may be consulted to identify a particular viewport 190 to be used when playing back the new hypervideo 180 as directed by the different end user based upon a similarity of the new hypervideo 180 and one of the hypervideos 110 recorded in the user profile 150.

Figure 2:
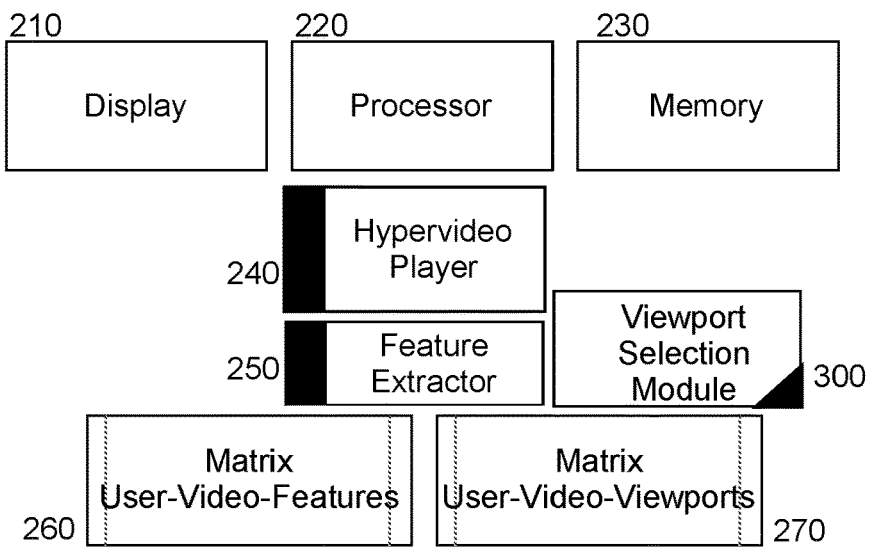
FIG. 2 is a schematic illustration of a hypervideo presentation data processing adapted for viewport selection; and, FIG. 3 is a flow chart illustrating a process for viewport selection for hypervideo presentation.

The processed described in connection with FIG. 1 may be implemented in a hypervideo presentation data processing system. In yet further illustration, FIG. 2 is a schematic illustration of a hypervideo presentation data processing system adapted for viewport selection. The system includes a host computing system that includes at least one computer with a display 210, one or more processors 220 and memory 230. A hypervideo player 240 executes in the memory 230 of the host computing system in order to playback different hypervideos. A feature extractor 250 is coupled to the hypervideo player 240. The feature extractor 250 identifies different image features of the different frames of each of the hypervideos and records the same in a matrix of user-video-features 260 in connection with a particular viewport selected for viewing corresponding ones of the hypervideos stored in a matrix of user-video-viewports 270.

Of note, a viewport selection module 300 is coupled to the hypervideo player 240. The viewport selection module 300 includes program code that when executed in the memory 230, is enabled to detect a directive to playback a new hypervideo in the hypervideo player 240. The program code is further enabled to extract features of the new hypervideo such as different objects or individuals present in different frames of the new hypervideo, different backgrounds, different hyperlinks or other hypermedia objects in the different frames of the new hypervideo. A matrix of user-video features 260 is then retrieved in which different video features are of previously viewed hypervideos are stored.

The extracted features are then compared by the program code to the different video features from the previously viewed hypervideos in the matrix of user-video-features 260 and a degree of similarity is specified based upon a number of the different video features of the previously viewed hypervideos in the matrix matching the extracted features with a higher degree of similarity resulting from a larger number of matching features, so as to compute a similarity value for each of the previously viewed hypervideos. Finally, the program code identifies one of the previously viewed hypervideos determined to have a greatest similarity to the new hypervideo and the program code locates in the matrix of user-video-viewports 270 a corresponding viewport for the previously viewed hypervideo determined to have the greatest similarity to the new hypervideo. Consequently, the program code applies the located viewport during playback of the new hypervideo in the hypervideo player 240.

Figure 3:
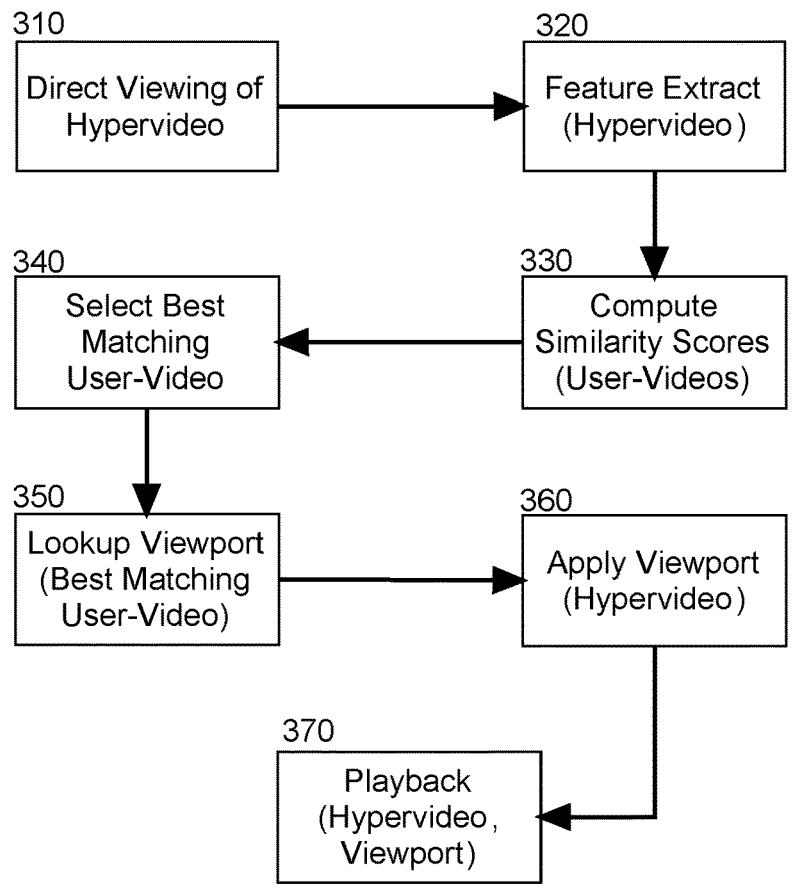

In even yet further illustration of the operation of the viewport selection module 300, FIG. 3 is a flow chart illustrating a process for viewport selection for hypervideo presentation. Beginning in block 310, the program code receives a directive from a primary end user to view a new hypervideo. In block 320, the program code loads the new hypervideo and one or more frames of the new hypervideo. The program code then extracts one or more image features of the one or more frames of the new hypervideo by processing each image frame and recognizing different image features in each of the frames, for instance, utilizing feature detection.

Then, in block 330, the program code computes a similarity score for each of a set of different previously viewed hypervideos based upon a similarity of the extracted image features of the new hypervideo in comparison to previously extracted image features of the previously viewed hypervideos. For instance, the program code may compare the image features of a frame of the new hypervideo to one or more frames of one or more of the previously viewed hypervideos in order to recognize similarities through image comparisons. In this regard, in one aspect of the embodiment, a nearest-neighbor feature matching algorithm may be employed so as to identify closely matching image features between the frames of the new hypervideo and frames of the previously viewed hypervideos. As such, ones of the different previously viewed hypervideos may be assigned a higher similarity score when a large number of image features in corresponding ones of the frames match that of the new hypervideo, whereas others of the different previously viewed hypervideos may be assigned a lower similarity score when a few number if any of the image features in corresponding ones of the frame match that of the new hypervideo.

Thereafter, in block 340, the program code selects a best matching one of the different previously viewed hypervideos based upon a computed similarity score of the highest value. In block 350, the program code then identifies a viewport corresponding to the best matching one of the different previously viewed hypervideos. In block 360, the program code applies the identified viewport to the playback of the new hypervideo by specifying the identified viewport to the hypervideo player when directing the hypervideo player to play back the new hypervideo. Finally, in block 370 the program code plays back the new hypervideo in the hypervideo player.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for viewport selection during playback of a 360° hypervideo capable of providing at least 360° of different views of a single plane about a vertex of a circle, comprising: recording end user interactions by an end user during playback of different 360° hypervideos, wherein the end user interactions include panning, tilting, and zooming operations used to establish respective viewports during playback of the different 360° hypervideos; and responsive to receiving a directive by the end user to view a new 360° hypervideo: playing back the new 360° hypervideo to the end user via a previously established viewport used during playback of a previously viewed 360° hypervideo, wherein the previously established viewport is selected based, at least in part, on a highest degree of similarity between an image feature matrix of a video frame previously viewed via the previously established viewport during playback of the previously viewed 360° hypervideo and an image feature matrix corresponding to a video frame of new 360° hypervideo, and further wherein the selected previously established viewport is most likely to avoid hyperlinked content of interest in the new 360° hypervideo from being obscured from the end user.

2. The method of claim 1, wherein the end user interactions further include a selection of different hypermedia elements in each of the different 360° hypervideos.

3. The method of claim 1, further comprising responsive to receiving a directive by a different but similar end user to view a different 360° hypervideo:
playing back to the different but similar end user the different 360° hypervideo via the previously selected viewport used during playback of the previously viewed 360° hypervideo,
wherein the previously selected viewport is selected based, at least in part, on comparing objects displayed to the end user during playback of the previously viewed 360° hypervideo to objects included in the new 360° hypervideo.

4. A 360° hypervideo presentation data processing system adapted for viewport selection during playback of a 360° hypervideo capable of providing at least 360° of different views of a single plane about a vertex of a circle, comprising: one or more computer processors; one or more computer readable storage media; computer program instructions; said computer program instructions being stored on said one or more computer readable storage media for execution by said one or more computer processors; and said computer program instructions comprising instructions to: record end user interactions by an end user during playback of different 360° hypervideos, wherein the end user interactions include panning, tilting, and zooming operations used to establish respective viewports during playback of the different 360° hypervideos; and responsive to receiving a directive by the end user to view a new 360° hypervideo: play back the new 360° hypervideo to the end user via a previously established viewport used during playback of a previously viewed 360° hypervideo, wherein the previously established viewport is selected based, at least in part, on a highest degree of similarity between an image feature matrix of a video frame previously viewed via the previously established viewport during playback of the previously viewed 360° hypervideo and an image feature matrix corresponding to a video frame of new 360° hypervideo, and further wherein the selected previously established viewport is most likely to avoid hyperlinked content of interest in the new 360° hypervideo from being obscured from the end user.

5. The system of claim 4, wherein the end user interactions further include a selection of different hypermedia elements in each of the different 360° hypervideos.

6. The system of claim 4, further comprising responsive to receiving a directive by a different but similar end user to view a different 360° hypervideo:
play back to the different but similar end user the different 360° hypervideo via the previously selected viewport used during playback of the previously viewed 360° hypervideo,
wherein the previously selected viewport is selected based, at least in part, on comparing objects displayed to the end user during playback of the previously viewed 360° hypervideo with objects included in the new 360° hypervideo.

7. A computer program product for viewport selection during playback of a 360° hypervideo capable of providing at least 360° of different views of a single plane about a vertex of a circle, the computer program product comprising one or more computer readable storage media and program instructions stored on said one or more computer readable storage media, wherein the computer readable storage medium is not transitory signal per se, said program instructions comprising instructions to: record end user interactions by an end user during playback of different 360° hypervideos, wherein the end user interactions include panning, tilting, and zooming operations used to establish respective viewports during playback of the different 360° hypervideos; and responsive to receiving a directive by the end user to view a new 360° hypervideo: play back the new 360° hypervideo to the end use via a previously established viewport used during playback of a previously viewed 360° hypervideo, wherein the previously established viewport is selected based, at least in part, on a highest degree of similarity between an image feature matrix of a video frame previously viewed via the previously established viewport during playback of the previously viewed 360° hypervideo and an image feature matrix corresponding to a video frame of new 360° hypervideo, and further wherein the selected previously established viewport is most likely to avoid hyperlinked content of interest in the new 360° hypervideo from being obscured from the end user.

8. The computer program product of claim 7, wherein the end user interactions further include a selection of different hypermedia elements in each of the different 360° hypervideos.

9. The computer program product of claim 7, further comprising responsive to receiving a directive by a different but similar end user to view a different hypervideo:
play back to the different but similar end user the different 360° hypervideo via the previously selected viewport used during playback of the previously viewed 360° hypervideo,
wherein the previously selected viewport is selected based, at least in part, on comparing objects displayed to the end user during playback of the previously viewed 360° hypervideo with objects included in the new 360° hypervideo.

* * * * *